US012387550B2

(12) United States Patent
Sumi

(10) Patent No.: US 12,387,550 B2
(45) Date of Patent: Aug. 12, 2025

(54) PUSHBUTTON SWITCH, OPERATING UNIT, AND AMUSEMENT MACHINE

(71) Applicant: OMRON Corporation, Kyoto (JP)

(72) Inventor: Masaaki Sumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 397 days.

(21) Appl. No.: 17/996,647

(22) PCT Filed: May 28, 2020

(86) PCT No.: PCT/JP2020/021153

§ 371 (c)(1),
(2) Date: Oct. 20, 2022

(87) PCT Pub. No.: WO2021/240736

PCT Pub. Date: Dec. 2, 2021

(65) Prior Publication Data

US 2023/0230438 A1 Jul. 20, 2023

(51) Int. Cl.

*G07F 17/32* (2006.01)
*H01H 13/10* (2006.01)
*H01H 13/14* (2006.01)

(52) U.S. Cl.

CPC ...... *G07F 17/3209* (2013.01); *G07F 17/3211* (2013.01); *G07F 17/3216* (2013.01); *H01H 13/10* (2013.01); *H01H 13/14* (2013.01)

(58) Field of Classification Search

CPC ............. G07F 17/3209; G07F 17/3211; G07F 17/3216; H01H 13/10; H01H 13/14; G06F 3/0393

See application file for complete search history.

(56) References Cited

U.S. PATENT DOCUMENTS

| | | | | |
|---|---|---|---|---|
| 6,234,651 | B1 | 5/2001 | Kodama et al. | |
| 10,310,677 | B2 * | 6/2019 | Stevens | G06F 3/0416 |
| 10,431,037 | B2 | 10/2019 | Jadeja | |
| 11,269,470 | B2 * | 3/2022 | Mori | G06F 3/0447 |
| 11,579,665 | B2 * | 2/2023 | Hinson | H01H 19/115 |
| D1,029,943 | S * | 6/2024 | Han | D21/333 |

(Continued)

FOREIGN PATENT DOCUMENTS

| | | |
|---|---|---|
| JP | 2000-57873 A | 2/2020 |
| JP | 2020-67668 A | 4/2020 |

OTHER PUBLICATIONS

An English translation of the International Search Report ("ISR") of PCT/JP2020/021153 mailed on Sep. 1, 2020.

(Continued)

*Primary Examiner* — Kang Hu
*Assistant Examiner* — Ross A Williams
(74) *Attorney, Agent, or Firm* — METROLEX IP LAW GROUP, PLLC; Robert L. Scott, Esq.

(57) ABSTRACT

An amusement machine includes a button deck. The button deck includes a transparent support and a display together serving as a touchscreen, and a pushbutton switch. The pushbutton switch includes an operable portion attached to a first surface of the transparent support, and a detector attached to a second surface of the transparent support and facing the operable portion. The operable portion includes a button. The detector includes a reflective sensor that detects a pressed state of the button through the transparent support.

14 Claims, 9 Drawing Sheets

(56) References Cited

U.S. PATENT DOCUMENTS

| | | | | |
|---|---|---|---|---|
| 2001/0018363 | A1* | 8/2001 | Goto | G05G 9/047 463/37 |
| 2013/0194202 | A1* | 8/2013 | Moberg | G06F 3/0393 345/173 |
| 2014/0035834 | A1* | 2/2014 | Sharma | G06F 1/1669 345/173 |
| 2014/0247246 | A1* | 9/2014 | Maus | G06F 3/0393 345/174 |
| 2015/0146944 | A1* | 5/2015 | Pi | G06F 21/32 382/124 |
| 2018/0024649 | A1* | 1/2018 | Uno | G06F 3/0338 345/174 |
| 2019/0015721 | A1* | 1/2019 | Iwanchuk | A63B 1/00 |
| 2021/0294490 | A1* | 9/2021 | Hung | G06F 3/0202 |
| 2023/0021789 | A1* | 1/2023 | Kim | G06F 3/0362 |
| 2023/0077786 | A1* | 3/2023 | Kim | H01H 13/06 200/341 |
| 2023/0142581 | A1* | 5/2023 | Kim | G06F 3/0202 349/56 |
| 2024/0126400 | A1* | 4/2024 | Choi | G06F 3/0481 |
| 2024/0378939 | A1* | 11/2024 | Morrison | G06F 3/0362 |

OTHER PUBLICATIONS

The Written Opinion("WO") of PCT/JP2020/021153 mailed on Sep. 1, 2020.

* cited by examiner

PUSHBUTTON SWITCH, OPERATING UNIT, AND AMUSEMENT MACHINE

FIELD

The present disclosure relates to a pushbutton switch, an operating unit, and an amusement machine.

BACKGROUND

Patent Literature 1 describes a known pushbutton assembly. The pushbutton assembly described in Patent Literature 1 includes a display and at least one pushbutton switch. The display includes a transparent material on its display surface to support the pushbutton switch. The transparent material is a support for the pushbutton switch.

CITATION LIST

Patent Literature

Patent Literature 1: U.S. Pat. No. 10,431,037

SUMMARY

In the pushbutton assembly described in Patent Literature 1, the pushbutton switch is received in an attachment opening in the transparent material. However, the structure with an opening may lower the strength of the transparent material. When the pushbutton switch is included in an amusement machine for receiving operations, in particular, the transparent material may fracture with cracks extending from the opening.

Accordingly, one or more embodiments is directed to a technique that may reduce fracture of a support in a pushbutton switch.

A switch, a unit, and a machine according to one or more embodiments have the structures described below.

More specifically, a pushbutton switch according to one or more embodiments includes an operable portion attached to a first surface of a support may comprise a plate and may at least partially comprise a transparent area, and a detector attached to a second surface of the support and facing the operable portion with the transparent area being located between the detector and the operable portion. The operable portion includes a press portion, and the detector includes a sensor that detects a pressed state of the press portion through the transparent area.

An operating unit according to one or more embodiments includes a transparent support and a display together serving as a touchscreen, and a pushbutton switch. The pushbutton switch includes an operable portion attached to a surface of the transparent support opposite to the display, and a detector attached to a surface of the transparent support adjacent to the display. The detector faces the operable portion. The operable portion includes a press portion. The detector includes a sensor that detects a pressed state of the press portion through the transparent support.

An amusement machine according to one or more embodiments includes a first display that displays an image for amusement, a transparent support and a second display together serving as a touchscreen, and a pushbutton switch. The pushbutton switch includes an operable portion attached to a surface of the transparent support opposite to the second display, and a detector attached to a surface of the transparent support adjacent to the second display. The detector faces the operable portion. The operable portion includes a press portion. The detector includes a sensor that detects a pressed state of the press portion through the transparent support.

The technique according to one or more embodiments may reduce fracture of the support in the pushbutton switch.

DETAILED DESCRIPTION

One or more embodiments of the present invention (hereafter also referred to as the present embodiment) will now be described with reference to the drawings. In the present embodiment, a pushbutton switch and an operating unit according to an aspect of the present invention are included in an amusement machine. The present invention is not limited to the embodiments described below, and may be variously designed without departing from the spirit and scope of the invention. The pushbutton switch and the operating unit according to an aspect of the present invention can also be used for industrial equipment and consumer equipment, as well as for various amusement machines.

1. Example Use

Figure 1:
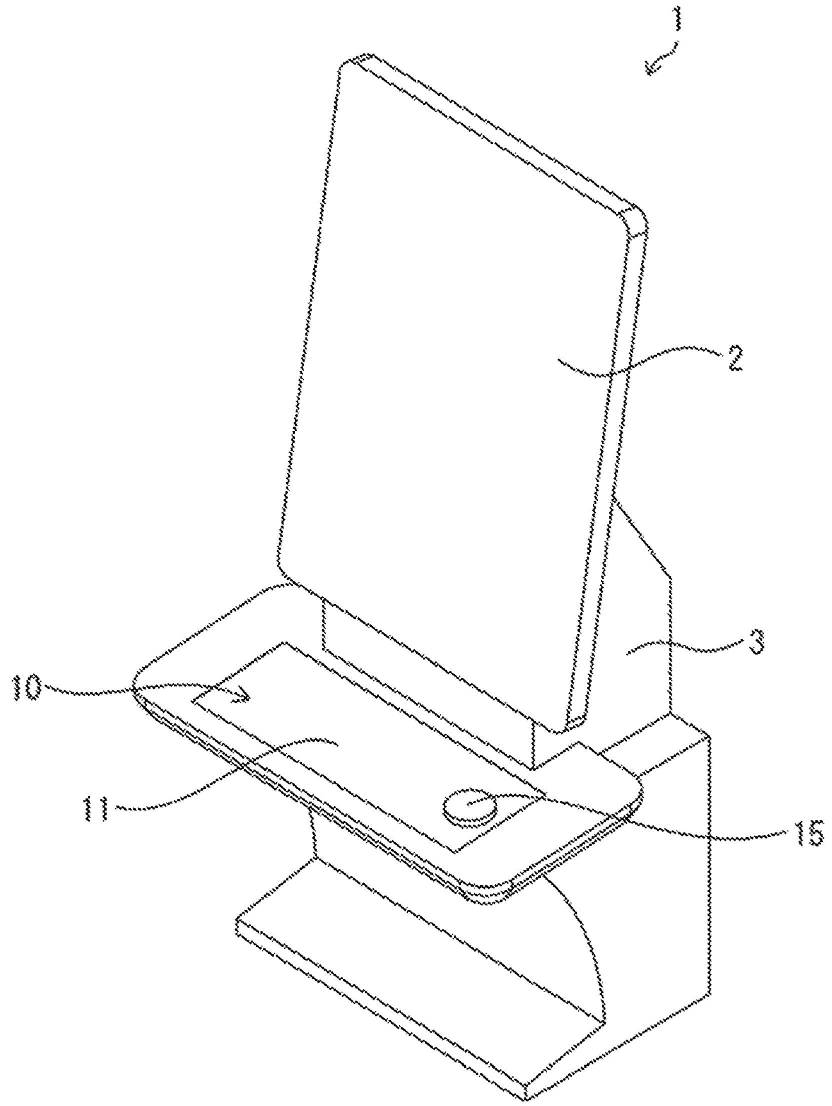
FIG. 1 is a diagram illustrating an external perspective view of an amusement machine according to one or more embodiments.
Figure 3:
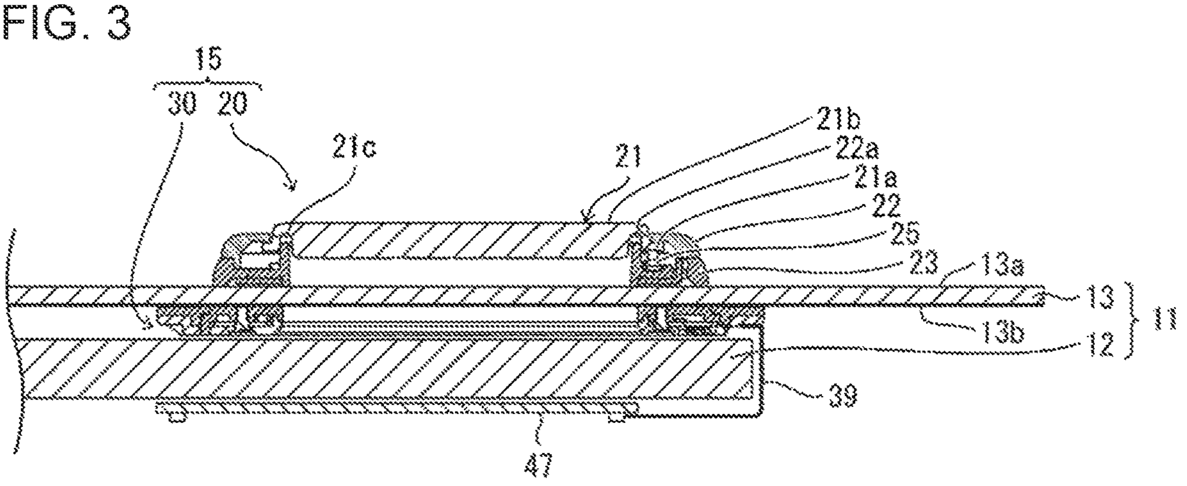
FIG. 3 is a diagram illustrating a cross-sectional view taken along line A-A as viewed in a direction indicated by arrows in FIG. 2.
Figure 4:
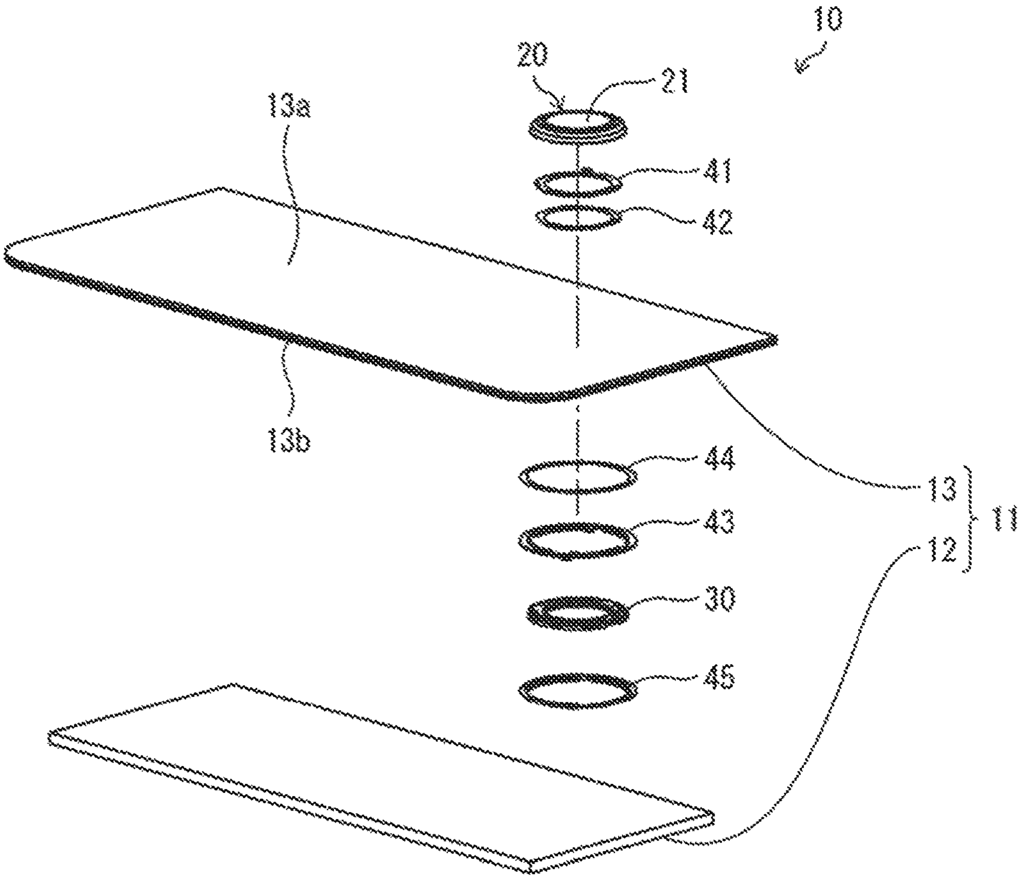
FIG. 4 is a diagram illustrating an exploded perspective view of a button deck, such as is shown in FIG. 2.

As shown in FIG. 1, a pushbutton switch 15 and a button deck 10, which is an operating unit including the pushbutton switch 15, may be included in an amusement machine 1. As shown in FIGS. 3 and 4, the button deck 10 includes the pushbutton switch 15 and a display input unit 11. The display input unit 11 includes a transparent support plate 13 and a display 12 and serves as a touchscreen. The pushbutton switch 15 includes, as separate portions, an operable portion 20 and a detector 30. The operable portion 20 includes a button (a press portion) 21. The detector 30 detects the pressed state of the button 21. The operable portion 20 is attached to one surface of the transparent support plate 13. The detector 30 is attached to the other surface of the transparent support plate 13. The operable portion 20 and the detector 30 face each other with the transparent support plate 13 in between. The detector 30 includes sensors for detecting the pressed state of the button 21 through the transparent support plate 13 (with the transparent support plate 13 in between).

Figure 7:
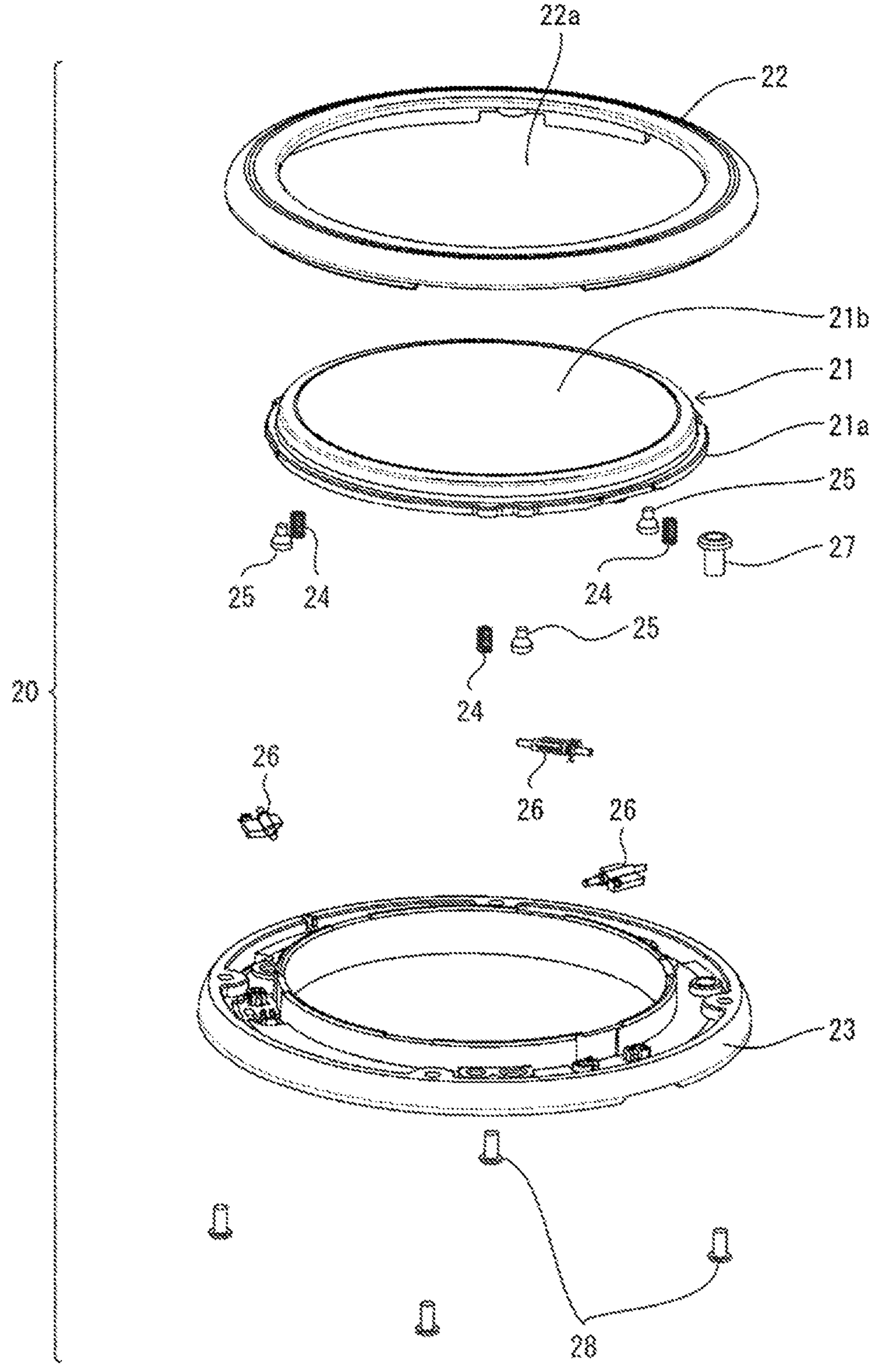
FIG. 7 is a diagram illustrating an exploded perspective view of an operable portion of a pushbutton switch in a button deck, such as is shown in FIG. 2.
Figure 9:
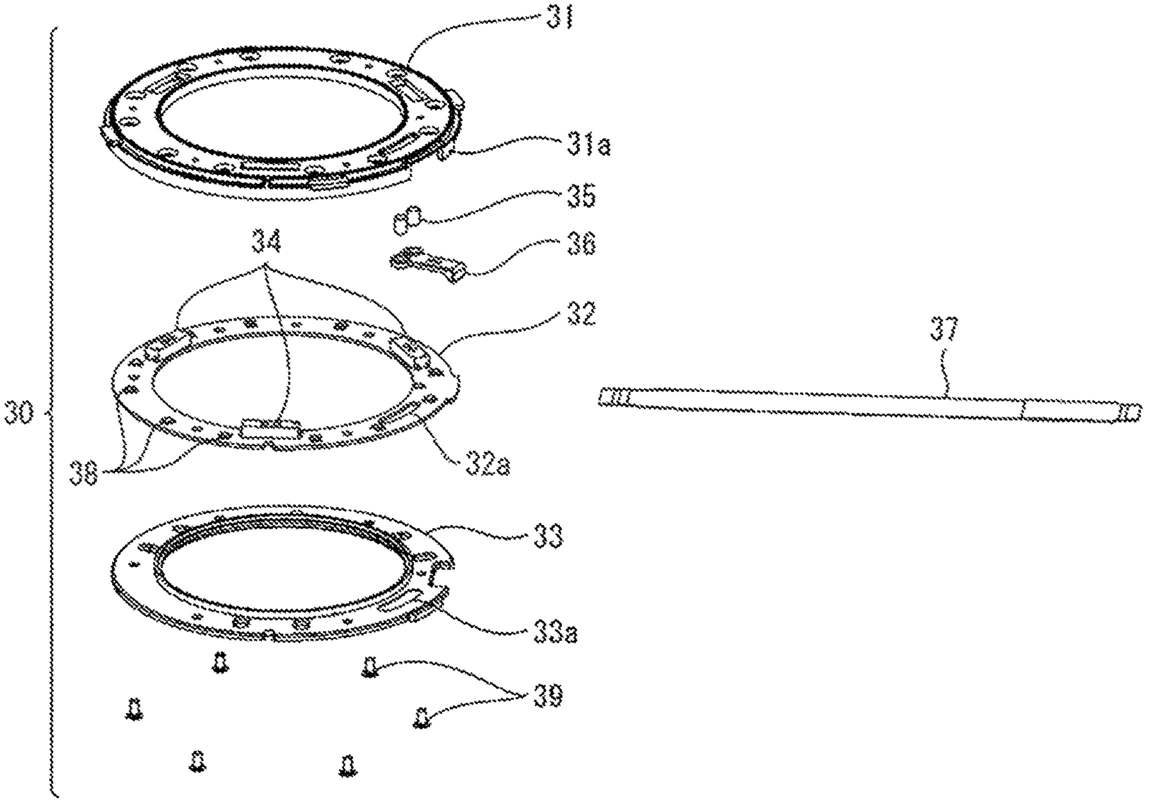
FIG. 9 is a diagram illustrating an exploded perspective view of a detector in a pushbutton switch in a button deck, such as is shown in FIG. 2.
Figure 12:
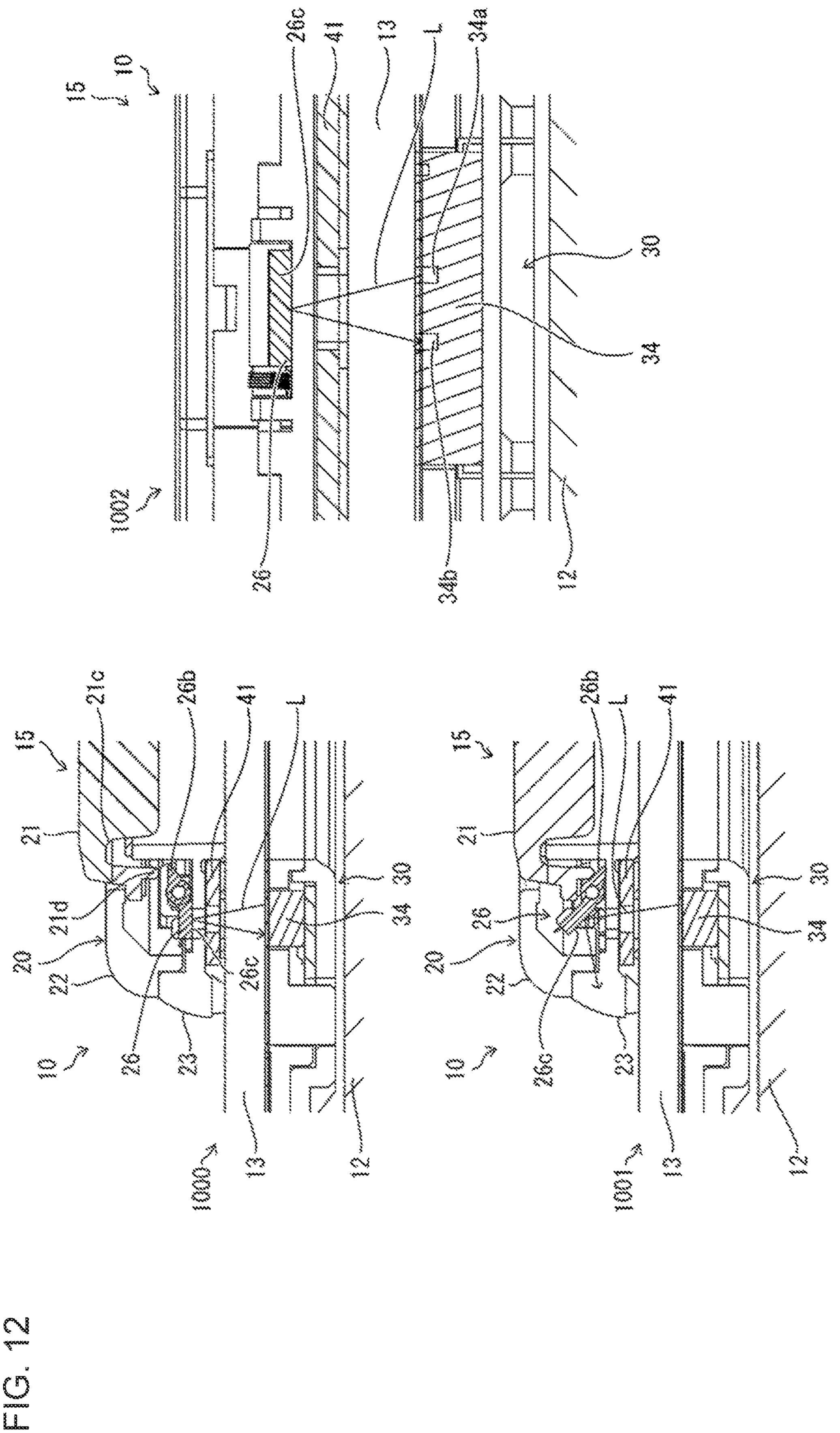
FIG. 12 is a diagram illustrating views of a structure for detecting a pressed state of a button in a pushbutton switch in a button deck, such as is shown in FIG. 2.

The sensors may be, for example, reflective sensors 34 as shown in FIGS. 9 and 12. As shown in FIGS. 7 and 12, the operable portion 20 includes reflective flappers 26 that are pressed by a lower end 21*d* of the button 21 and change their orientations when the button 21 is pressed. As shown in views 1000 and 1002 in FIG. 12, when the button 21 is unpressed, light from a reflective sensor 34 is reflected by a reflective flapper 26 and returns to the reflective sensor 34. As shown in a view 1001 in FIG. 12, when the button 21 is pressed, light from the reflective sensor 34 is reflected by the reflective flapper 26 in a direction different from the direction back toward the reflective sensor 34 without returning to the reflective sensor 34. The reflective sensor 34 receives light reflected by the reflective flapper 26 with changeable intensity, and the change in light intensity allows detection of the pressed state of the button 21.

The detector 30 may include, for example, range sensors. Using the reflective sensors 34 or the range sensors, electronic components for detecting a pressing operation can be included without being located in the operable portion 20. However, the electronic components for detecting a pressing operation may be located in the operable portion 20. Such a structure allows a wider choice of sensors.

The pushbutton switch 15 with the above structure eliminates an opening in the transparent support plate 13 for receiving the pushbutton switch 15. The transparent support plate 13 can thus reduce fracture due to a decrease in strength when the pushbutton switch 15 is included in the amusement machine 1 for receiving operations.

2. Example Structure

1. Amusement Machine

The schematic structure of the amusement machine according to the present embodiment will now be described with reference to FIG. 1. FIG. 1 is an external perspective view of the amusement machine 1 according to the present embodiment.

As shown in FIG. 1, the amusement machine 1 includes a main display unit (a first display) 2, a button deck (an operating unit) 10, and a housing 3 supporting these components.

The main display unit 2 displays images for a game played on the amusement machine 1 and includes, for example, a liquid crystal display (LCD). The main display unit 2 has its display surface facing the front of the amusement machine 1.

The button deck 10 receives the player's operations in a game on the amusement machine 1. In the present example, the button deck 10 is located below the main display unit 2 at the front of the amusement machine 1. The button deck 10 is rectangular and elongated laterally. The button deck 10 includes the display input unit 11 as a touchscreen, and the pushbutton switch 15.

For the amusement machine 1 providing slot machine gaming involving spinning reels, for example, the main display unit 2 displays multiple reels with multiple types of symbols. The button deck 10 receives the player's instruction for spinning the multiple reels, and receives the number of paylines and the number of bets selected by the player.

The multiple reels start spinning in response to the player's instruction for spinning received by the button deck 10. The reels automatically stop spinning under the control of a main controller 60 (refer to FIG. 11, described later). The pattern is determined by the combination of symbols on paylines and by the symbols appearing when the multiple reels are stopped. The player is rewarded based on the determined pattern and the number of bets.

2. Button Deck

Figure 2:
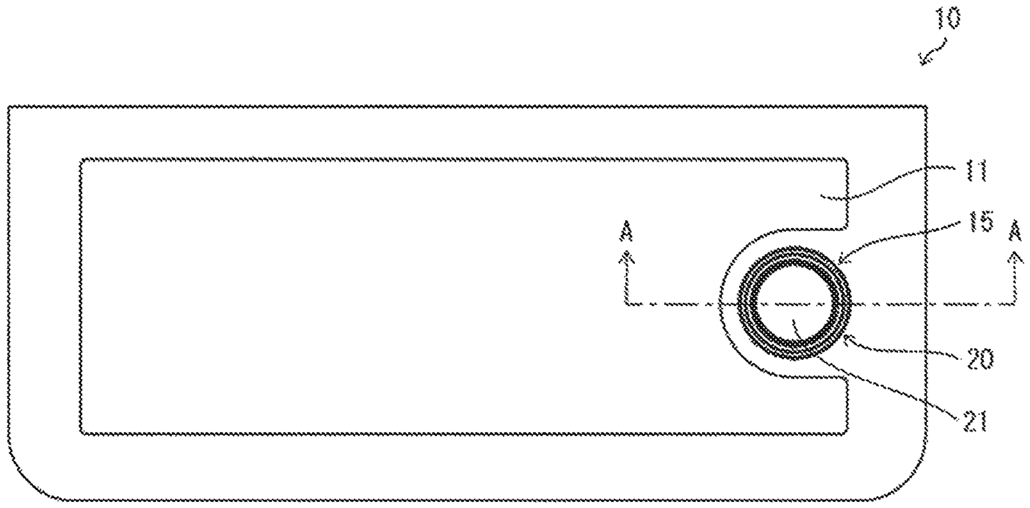
FIG. 2 is a diagram illustrating a plan view of a button deck that is an operating unit of an amusement machine, such as is shown in FIG. 1.
Figure 5:
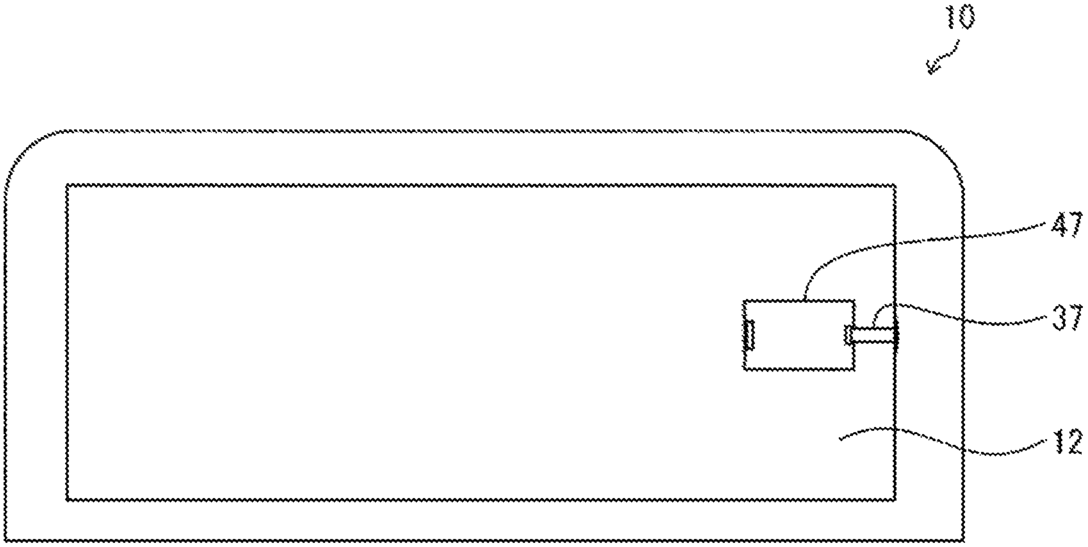
FIG. 5 is a diagram illustrating a bottom view of a button deck, such as is shown in FIG. 2.

FIG. 2 is a plan view of the button deck 10. FIG. 3 is a cross-sectional view taken along line A-A as viewed in the direction indicated by arrows in FIG. 2. FIG. 4 is an exploded perspective view of the button deck 10. FIG. 5 is a bottom view of the button deck 10.

As shown in FIG. 2, the display input unit 11 is rectangular and elongated laterally. The display input unit 11 includes the pushbutton switch 15 on its display surface. In the present example, the pushbutton switch 15 is circular and at the right end as viewed in plan (refer to FIG. 1).

As shown in FIG. 3, the display input unit 11 includes a display (a second display) 12 and a transparent support plate (a support) 13 located on the display surface of the display 12. In the present example, the transparent support plate 13 is a position input device. The transparent support plate 13 and the display 12 together serve as a touchscreen. The display 12 displays images of keys for receiving inputs to the amusement machine 1, images for a game, or other images.

The pushbutton switch 15 includes the operable portion 20 and the detector 30. The operable portion 20 is attached to one surface, specifically a first surface 13*a*, of the transparent support plate 13. The first surface 13*a* is opposite to the surface facing the display 12. The operable portion 20 includes the button (a press portion) 21 to receive a pressing operation. The button 21 is transparent.

The detector 30 is attached to the other surface, specifically a second surface 13*b*, of the transparent support plate 13 and faces the operable portion 20. The second surface 13*b* is adjacent to the display 12. The detector 30 includes sensors for detecting the pressed state of the button 21 through the transparent support plate 13.

In the present example, the sensors are reflective sensors 34 (refer to FIG. 9). However, the sensors may be any sensors other than the reflective sensors 34, such as range sensors, that can detect the pressed state of the button 21 through the transparent support plate 13. Electronic components for detecting a pressing operation may be located in the operable portion 20. Such a structure allows a wider choice of sensors. In the present example, the detector 30 is formed from a transparent material in its area facing the button 21 to allow the display surface of the display 12 to be viewed through the transparent button 21. The detector 30 may have an opening in its area facing the button 21.

In the present example, the pushbutton switch 15 is located above the display 12. The support is the transparent support plate 13 that is entirely transparent except for its outer edge portion. However, the pushbutton switch 15 may not be located above the display 12. In this case, the support may be transparent simply in its area receiving the operable portion 20 and the detector 30, or more specifically in its area through which the sensors in the detector 30 detect the pressed state of the button 21.

In the present example, as shown in FIG. 4, the operable portion 20 is attached to the first surface 13*a* of the transparent support plate 13 with the first attachment 41 in between. The operable portion 20 is removably attached to the first attachment 41. The first attachment 41 has an annular shape corresponding to the shape of a bezel 22 (refer to FIG. 7, described later) in the operable portion 20. The first attachment 41 is fixed to the first surface 13*a* using a double-sided tape piece 42 in the present example. Attaching the operable portion 20 to the first attachment 41 is described later.

The detector 30 is attached to the second surface 13*b* of the transparent support plate 13 with the second attachment 43 in between. The detector 30 is removably attached to the second attachment 43. In the present example, the second attachment 43 together with the locking member 45 allows attachment of the detector 30 to the transparent support plate 13. Each of the second attachment 43 and the locking member 45 has an annular shape and is fitted on the outer periphery of the detector 30. The second attachment 43 receives the detector 30 on its inner periphery, and the locking member 45 is fitted on the outer periphery of the detector 30. The locking member 45 is rotated relative to the second attachment 43 and engaged with the second attachment 43. This attaches the detector 30 to the second surface 13*b*. The second attachment 43 is fixed to the second surface 13*b* using a double-sided tape piece 44 in the present example.

Further, as shown in FIGS. 3 and 5, the display 12 in the display input unit 11 has its back surface connected to a relay board (a controller) 47 (described later). The relay board 47 is connected to the detector 30 through a flexible printed circuit (FPC) 37.

Figure 6:
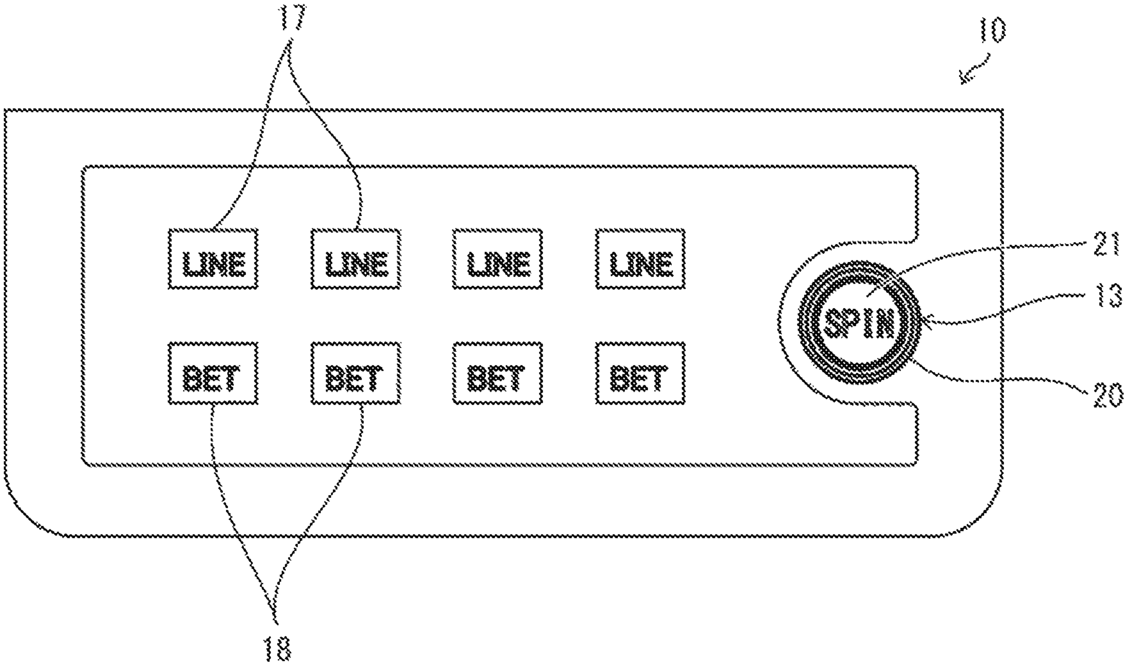
FIG. 6 is a diagram illustrating a view example display on a button deck, such as is shown in FIG. 2.

FIG. 6 is a view showing example display on the button deck 10. The example display in FIG. 6 shows an operation screen for a slot machine game played on the amusement machine 1. The pushbutton switch 15 serves as a SPIN button that receives the instruction for spinning the multiple reels. The display 12 displays the letters SPIN indicating the SPIN button at the position corresponding to the button 21. The letters SPIN are viewable through the transparent button 21. The display input unit 11 displays LINE buttons 17 for selecting the number of paylines and BET buttons 18 for selecting the number of bets.

3. Pushbutton Switch Structure 3-1. Operable Portion

Figure 8:
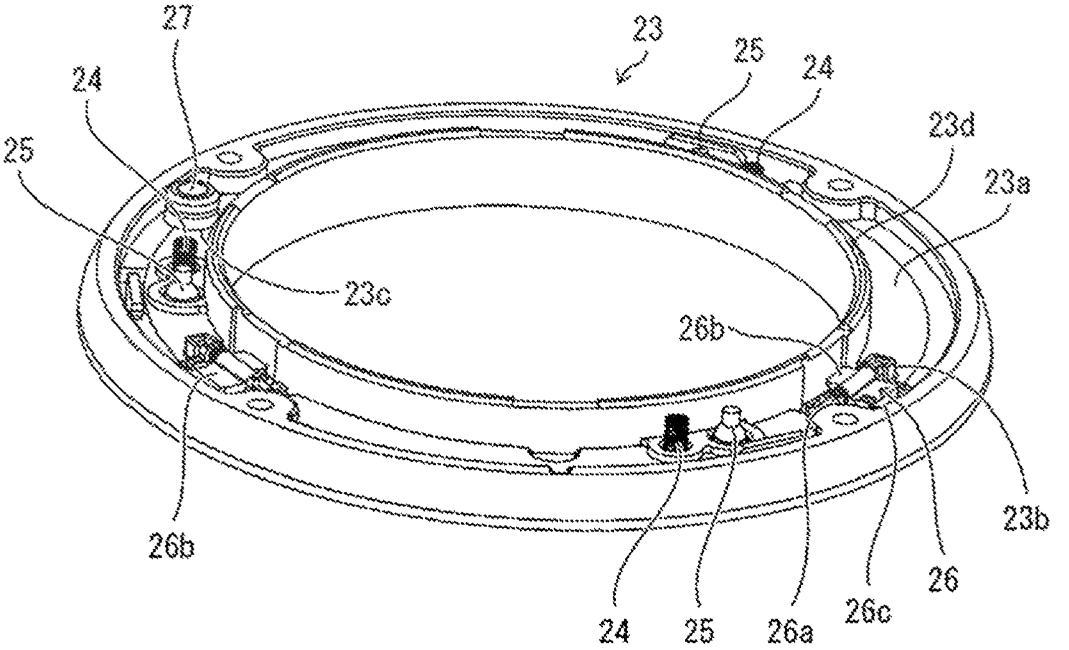
FIG. 8 is a diagram illustrating a perspective view of a base supporting multiple components in an operable portion, such as is shown in FIG. 7.

The operable portion 20 will now be described with reference to FIGS. 3, 7, and 8. FIG. 7 is an exploded perspective view of the operable portion 20 of the pushbutton switch 15 in the button deck 10. FIG. 8 is a perspective view of a base 23 supporting multiple components in the operable portion 20.

As shown in FIG. 7, the operable portion 20 includes the button 21, the bezel 22, the base 23, multiple springs 24, multiple tactile-sensation rubber pieces 25, the locking magnet 27, and multiple reflective flappers 26.

The button 21 is supported between the bezel 22 and the base 23 and can receive a pressing operation. For ease of explanation, the operable portion 20 is located horizontally, and the button 21 has the pressing direction being downward and the returning direction being upward.

The button 21 is formed from a transparent material and is circular in the present example (refer to FIG. 2). The button 21 includes a flange 21*a* on its outer periphery. The button 21 can be pressed with the flange 21*a* being held between the base 23 and the bezel 22 attached to the base 23. The bezel 22 has an opening 22*a* through which an upper surface 21*b* of the button 21 is exposed.

The base 23 supports, for example, the button 21, the bezel 22, the multiple springs 24, the multiple tactile-sensation rubber pieces 25, the locking magnet 27, and the multiple reflective flappers 26. The base 23 is fastened to the transparent support plate 13 with the first attachment 41 in between.

As shown in FIG. 8, the base 23 includes an annular component compartment 23*a* in an outer peripheral portion. The component compartment 23*a* accommodates the multiple springs 24, the multiple tactile-sensation rubber pieces 25, the locking magnet 27, and the multiple reflective flappers 26.

The multiple springs 24 return the pressed button 21 to the position before pressing. The multiple tactile-sensation rubber pieces 25 provide a tactile sensation to the player pressing the button 21. In the present example, three springs 24 and three tactile-sensation rubber pieces 25 are included.

The multiple springs 24 and the multiple tactile-sensation rubber pieces 25 are in contact with the flange 21*a* on the outer periphery of the button 21 (refer to FIG. 3). The multiple springs 24 in contact with the flange 21*a* can return the pressed button 21 to its original position. The multiple tactile-sensation rubber pieces 25 in contact with the flange 21*a* can provide a tactile sensation to the player pressing the button 21.

The reflective flappers 26 are used when the detector 30 detects the pressed state of the button 21. In the present example, three (multiple) reflective flappers 26 are included. The reflective flappers 26 are supported pivotally on support portions 23*b* of the component compartment 23*a*. Each reflective flapper 26 includes a shaft 26*a* extending in the circumferential direction of the component compartment 23*a*.

Each reflective flapper 26 includes a press piece 26*b* located inward from the shaft 26*a* and a reflective portion 26*c* located outward from the shaft 26*a*. The press piece 26*b* comes in contact with and is pressed by the lower end 21*d* (refer to views 1000 and 1001 in FIG. 12) of an outer peripheral portion of the button 21. The reflective portion 26*c* has its lower surface being a reflective surface. The reflective flapper 26 changes its orientation in accordance with the pressed or unpressed state of the button 21 and thus changes the orientation of the reflective surface (refer to the views 1000 and 1001 in FIG. 12). The component compartment 23*a* has openings at the bottom to allow passage of light from the reflective sensors 34 in the detector 30 and allow passage of light reflected by the reflective flappers 26 toward the reflective sensors 34. The first attachment 41 also has such openings.

The locking magnet 27 is rod-like and has the direction of magnetization parallel to the pressing direction of the button 21. The locking magnet 27 has its lower end fitted in a loose-fitting hole 41*h* (refer to FIG. 15, described later) in the first attachment 41 to restrict rotation of the operable portion 20 and lock the operable portion 20. The locking magnet 27 is fitted loosely in a hole 23*c* in the bottom of the component compartment 23*a*. The locking magnet 27 includes a head with a larger diameter than the other portion. The locking magnet 27 is prevented from falling out of the hole 23*c* with its head stuck in the hole 23*c*.

The component compartment 23*a* includes an inner peripheral wall 23*d* defining the component compartment 23*a*. The wall 23*d* guides the button 21 to move vertically when the button 21 is pressed or returns. As shown in FIG. 3, the button 21 has a groove 21*c* on its lower surface to receive the upper end of the wall 23*d*.

To prepare the operable portion 20, the button 21 and the bezel 22 are fitted from above in this order onto the component compartment 23*a* accommodating the above various components. The base 23 and the bezel 22 are then fastened together with multiple screws 28.

3-2. Detector

Figure 10:
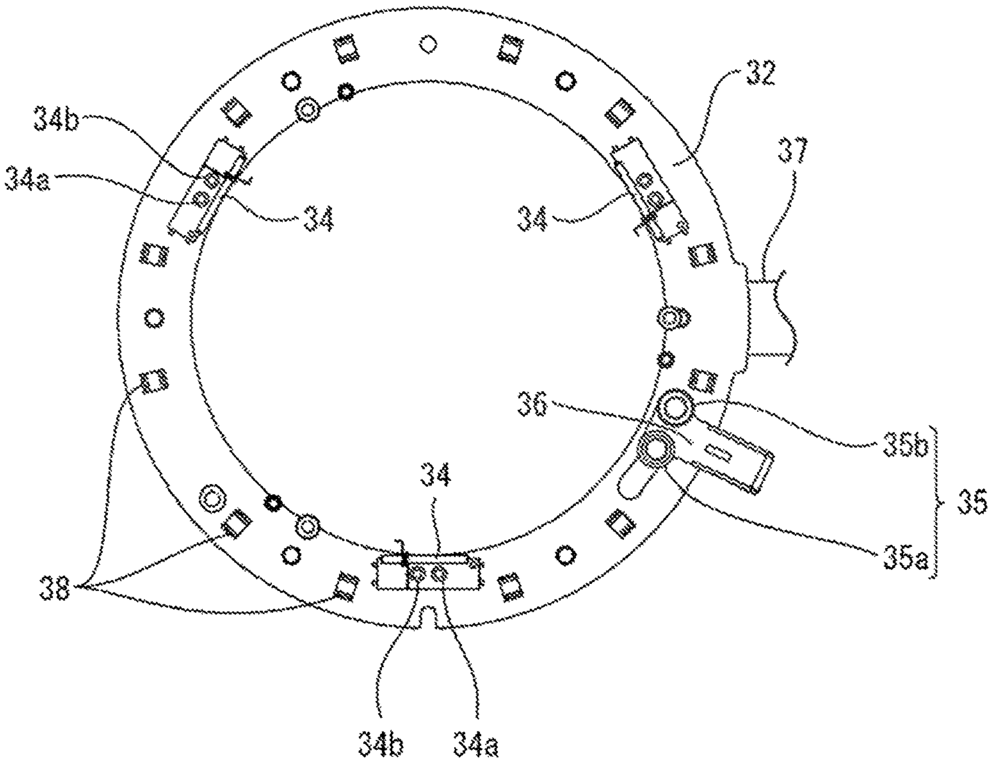
FIG. 10 is a diagram illustrating a plan view of a mounting board in a detector, such as is shown in FIG. 9.

The detector 30 will now be described with reference to FIGS. 3, 9, and 10. FIG. 9 is an exploded perspective view of the detector 30 in the pushbutton switch 15 in the button deck 10. FIG. 10 is a plan view of a mounting board 32. FIG. 10 also shows an operation lever 36 including an attachment magnet assembly 35.

As shown in FIG. 9, the detector 30 includes a case 31, the mounting board 32, a lower cover 33, the multiple reflective sensors 34, the attachment magnet assembly 35, the operation lever 36, and the FPC 37.

The multiple reflective sensors 34 are mounted on the mounting board 32. In the present example, three reflective sensors 34 are included to correspond to the three reflective flappers 26 in the operable portion 20. Each reflective sensor 34 faces the corresponding reflective flapper 26 with the operable portion 20 and the detector 30 being attached to the transparent support plate 13.

The reflective sensor 34 is an optical sensor including a light emitter 34*a* and a light receiver 34*b*. The light emitter 34*a* emits light toward the reflective flapper 26 through the transparent support plate 13. The reflective flapper 26 reflects the light that is then received by the light receiver 34*b*. The light receiver 34*b* receives light with intensity changeable in accordance with the orientation of the reflective flapper 26. The change in light intensity thus allows detection of the pressed state of the button 21.

As shown in FIG. 10, the mounting board 32 incorporates multiple light-emitting diodes (LEDs) (light emitters or electronic components) 38 as well as the multiple reflective sensors 34. The detector 30 can thus emit light when the multiple LEDs 38 is on.

The FPC 37 has one end connected to the mounting board 32 and the other end connected to the relay board 47 (refer to FIG. 3) attached to the back surface of the display 12. The FPC 37 electrically connects the mounting board 32 and the relay board 47.

As shown in FIGS. 9 and 10, the attachment magnet assembly 35 includes an attraction magnet 35*a* and a repulsion magnet 35*b*. The attraction magnet 35*a* and the repulsion magnet 35*b* both are rod-like and have the direction of magnetization parallel to the pressing direction of the button 21, but are arranged to have opposite polarities. The attraction magnet 35*a* attracts the locking magnet 27 in the operable portion 20 through the transparent support plate 13. The repulsion magnet 35*b* repels and lifts the locking magnet 27 in the operable portion 20 through the transparent support plate 13.

The attraction magnet 35*a* and the repulsion magnet 35*b* are supported integrally on the operation lever 36. The operation lever 36 protrudes outward from the outer periphery of the detector 30. The operation lever 36 is movable back and forth circumferentially along a guide slot 32*a* in the mounting board 32 and along a guide slot 33*a* in the lower cover 33. The operation lever 36 is operable to switch the magnet facing the locking magnet 27 in the operable portion 20 between the attraction magnet 35*a* and the repulsion magnet 35*b*. The attachment magnet assembly 35 and the operation lever 36 serve as a switcher. The switcher selectively places the first magnet or the second magnet at the position facing the locking magnet 27 in the operable portion 20 attached to the first attachment 41 (described later).

The case 31 supports, for example, the mounting board 32, the multiple reflective sensors 34, the attachment magnet assembly 35, and the operation lever 36. The case 31 has openings through which the attachment magnet assembly 35 and the multiple reflective sensors 34 face the locking magnet 27 and the multiple reflective flappers 26 in the operable portion 20. The lower cover 33 is fitted to the case 31 and covers the bottom of the detector 30.

To prepare the detector 30, the lower cover 33 is fitted onto the bottom of the case 31 accommodating, for example, the attachment magnet assembly 35, the operation lever 36, and the mounting board 32. The case 31 and the lower cover 33 are then fastened together with multiple screws 39.

4. Control System in Amusement Machine

Figure 11:
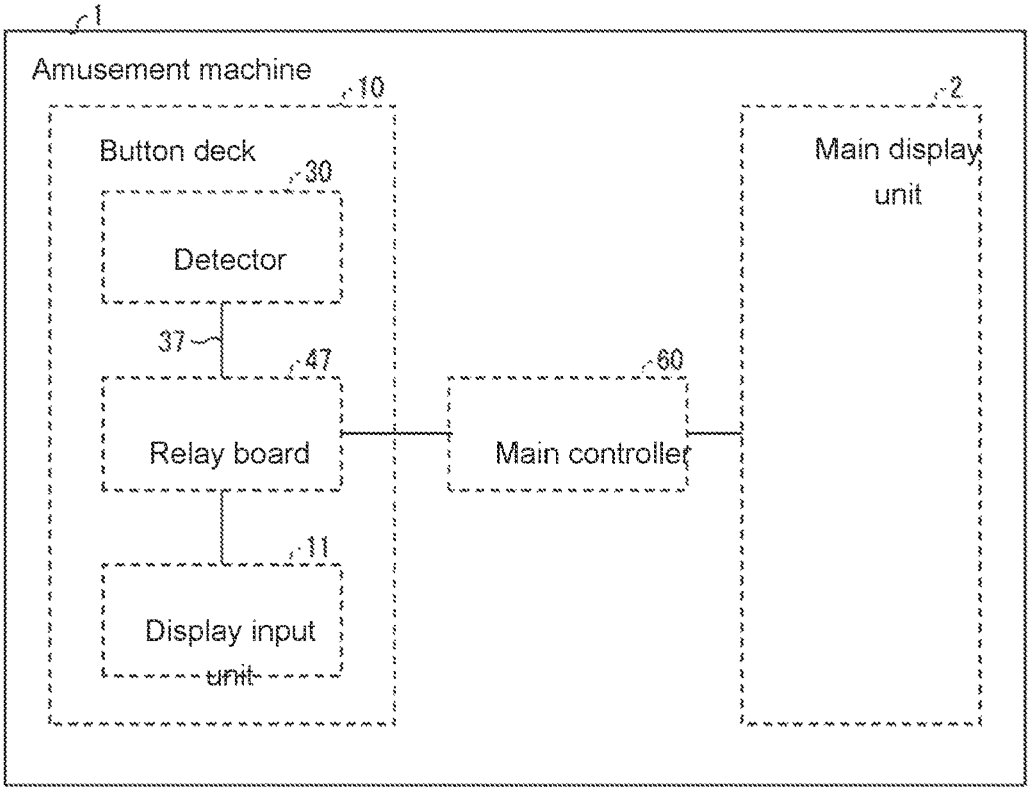
FIG. 11 is a block diagram illustrating an amusement machine, such as is shown in FIG. 1, that includes a control system.

FIG. 11 is a block diagram of the amusement machine 1, showing a control system. As shown in FIG. 11, the amusement machine 1 includes the main controller 60 and the relay board 47 as a controller. The main controller 60 is connected to the main display unit 2 and causes the main display unit 2 to display images for a game to perform the game.

The main controller 60 is also connected to the relay board 47 and receives, using the relay board 47, an instruction input on the button deck 10. The main controller 60 also controls the button deck 10 using the relay board 47. The relay board 47 controls the operation of the button deck 10, and is connected to the detector 30 through the FPC 37 and also connected to the display input unit 11 as a touchscreen.

As described above, the button deck 10 in the present example includes the pushbutton switch 15 including, as separate portions, the operable portion 20 and the detector 30. The electronic components are located in the detector 30 alone attached to the second surface 13*b* of the transparent support plate 13 adjacent to the inside of the machine. The relay board 47 is thus unconnected to the operable portion 20.

5. Detecting Pressing Operation with Pushbutton Switch

FIG. 12 includes views each showing a structure for detecting the pressed state of the button 21 in the pushbutton switch 15 in the button deck 10. FIG. 12 includes a cross-sectional view 1000 of the main part of the pushbutton switch 15 with the button 21 being unpressed, and includes a cross-sectional view 1001 of the main part of the pushbutton switch 15 with the button 21 being pressed. FIG. 12 also includes a cross-sectional view 1002 of the main part of the pushbutton switch 15 being unpressed. The view 1002 is taken along a line different from the line for the view 1001.

As shown in the views 1000 and 1002 in FIG. 12, when the button 21 is unpressed, each reflective flapper 26 in the operable portion 20 is in a first orientation to reflect light from the corresponding reflective sensor 34 in the detector 30 in the direction back toward the reflective sensor 34. In the first orientation, the reflective surface reflects light from the light emitter 34*a* in the direction for entry into the light receiver 34*b*.

The light receiver 34*b* receives, through the transparent support plate 13, light L emitted from the light emitter 34*a* and reflected by the reflective flapper 26 in the first orientation. The light receiver 34*b* outputs an electrical signal corresponding to the intensity of the received reflected light, and allows detection of the button 21 being unpressed based on the electrical signal.

As shown in the view 1001 in FIG. 12, when the button 21 is pressed, each reflective flapper 26 in the operable portion 20 is in a second orientation to reflect light from the corresponding reflective sensor 34 in the detector 30 in a direction different from the direction toward the reflective sensor 34. In the second orientation, the reflective surface reflects light from the light emitter 34*a* in a direction different from the direction for entry into the light receiver 34*b*.

The light receiver 34*b* does not receive light L emitted from the light emitter 34*a* and reflected by the reflective flapper 26 in the second orientation, and thus receives light with reduced intensity. The light receiver 34*b* outputs a lower electrical signal in accordance with the reduced intensity of received light. This change in the electrical signal allows detection of the button 21 being pressed.

6. Tabs 41*a* on First Attachment 41

Figure 13:
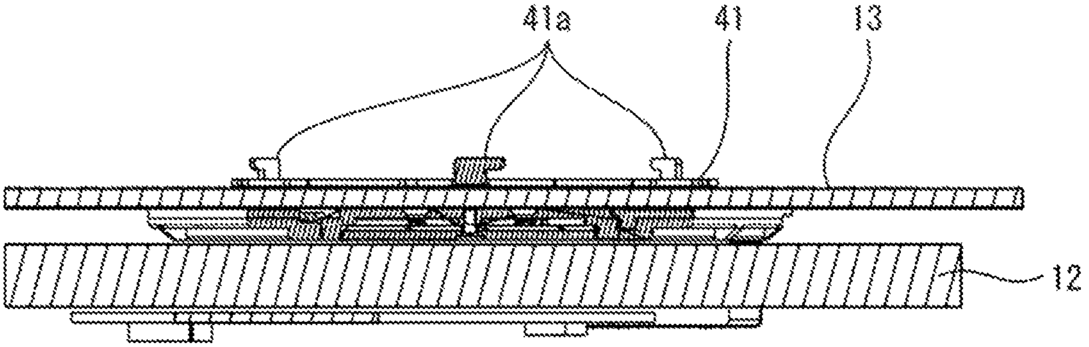
FIG. 13 is a diagram illustrating a cross-sectional view of tabs on a first attachment in a button deck, such as is shown in FIG. 4.
Figure 14:
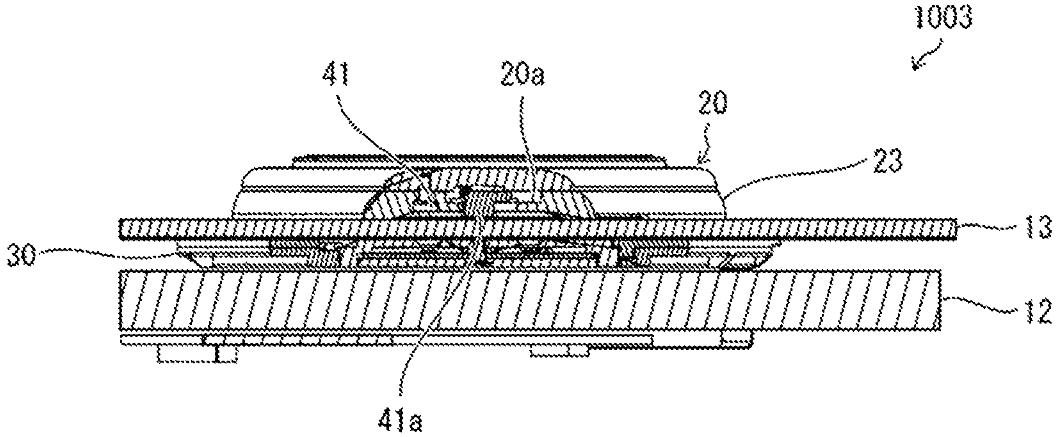
FIG. 14 is a diagram illustrating cross-sectional views of an engagement portion of a base in an operable portion for engagement with a corresponding tab, such as is shown in FIG. 13.
Figure 14:
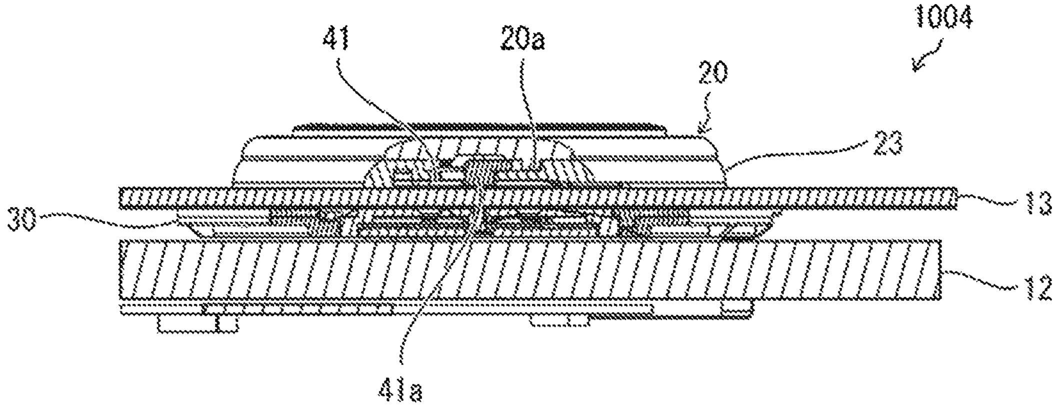

FIG. 13 is a cross-sectional view showing tabs 41*a* on the first attachment 41 in the button deck 10 shown in FIG. 4. FIG. 14 includes cross-sectional views each showing an engagement portion 20*a* of the base 23 in the operable portion 20 for engagement with the corresponding tab 41*a* shown in FIG. 13.

As shown in FIG. 13, the first attachment 41 includes the multiple tabs 41*a* protruding upward. Each tab 41*a* is an L-shaped hook. As shown in FIG. 14, the base 23 includes the engagement portion 20*a* engageable with the tab 41*a*. The operable portion 20 is rotatable about an axis aligned with the pressing direction from the operable portion 20 toward the detector 30. This engages the engagement portion 20*a* with the tab 41*a*, thus engaging the base 23 with the first attachment 41. The base 23 being engaged with the first attachment 41 fastens the operable portion 20 to the first attachment 41. The base 23 includes multiple engagement portions 20*a* corresponding to the multiple tabs 41*a*.

In the state shown in a view 1003 in FIG. 14, the tab 41*a* is spaced from the engagement portion 20*a*. When the operable portion 20 is rotated to engage with the first attachment 41, the engagement portion 20*a* engages with the tab 41*a* as shown in a view 1004 in FIG. 14. The engagement portion 20*a* being engaged with the tab 41*a* can fasten (attach) the operable portion 20 to the first attachment 41.

7. Lock Assembly for Operable Portion 20

Figure 15:
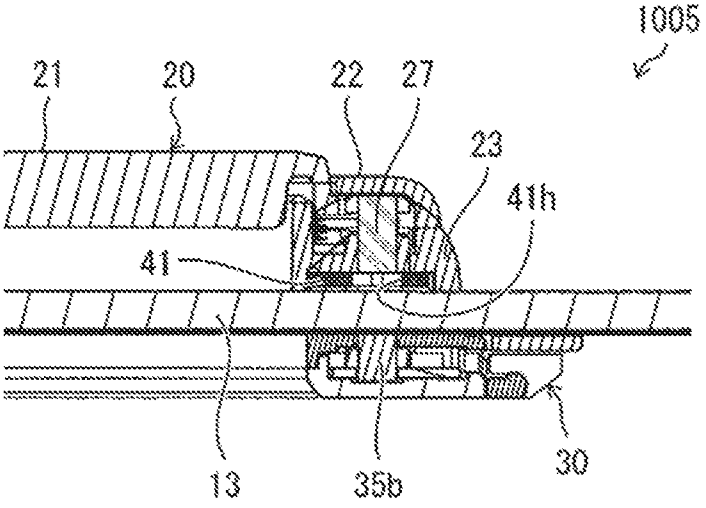
FIG. 15 is a diagram illustrating views of a lock assembly for an operable portion, such as is shown in FIG. 7.
Figure 15:
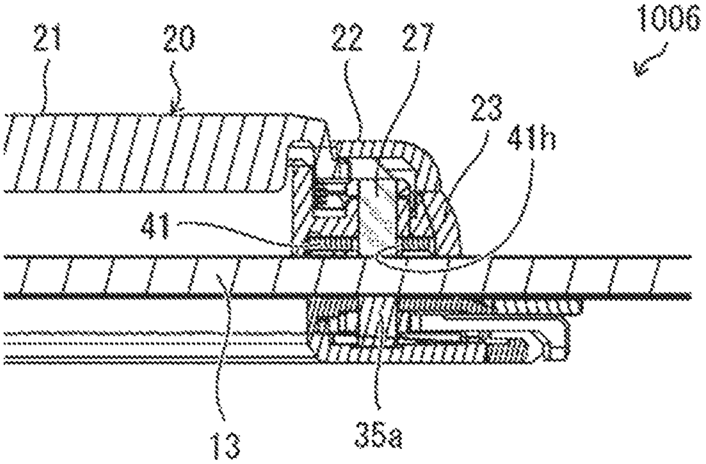

FIG. 15 includes views each showing a lock assembly for the operable portion 20 shown in FIG. 7. As shown in FIG. 15, the first attachment 41 has the loose-fitting hole 41*h* for receiving the lower end of the locking magnet 27 with the operable portion 20 being engaged with the first attachment 41. As shown in a view 1005 in FIG. 15, when the locking magnet 27 faces the repulsion magnet 35*b* with the transparent support plate 13 in between, the repulsion magnet 35*b* repels and lifts the locking magnet 27. In this state, the locking magnet 27 is outside the loose-fitting hole 41*h* and allows rotation of the operable portion 20 in the direction for disengagement from the first attachment 41.

As shown in a view 1006 in FIG. 15, when the locking magnet 27 faces the attraction magnet 35*a* with the transparent support plate 13 in between, the attraction magnet 35*a* attracts the locking magnet 27. In this state, the locking magnet 27 has its lower end fitted in the loose-fitting hole 41*h* and locks the operable portion 20 to the first attachment 41. Operating the above operation lever 36 can switch between the state shown in the view 1005 and the state shown in the view 1006. This can lock and unlock the operable portion 20 to and from the first attachment 41.

The operation lever 36 may be constantly urged to the position for locking. With this structure, the attraction magnet 35*a* magnetically attracts the locking magnet 27 and automatically locks the operable portion 20 when the operable portion 20 is attached to the first attachment 41. In this case, the operation lever 36 may be operated simply for placing the repulsion magnet 35*b* to face the locking magnet 27 to remove the operable portion 20 from the first attachment 41.

For the pushbutton switch 15 being installed substantially horizontally, the locking magnet 27 may fall into the loose-fitting hole 41*h* under its weight. Such a structure eliminates the attraction magnet 35*a*.

The operable portion 20 may include multiple locking magnets 27, and the first attachment 41 may have multiple loose-fitting holes 41*h* corresponding to the multiple locking magnets 27. In this case, the above switcher selectively places multiple attraction magnets 35*a* or multiple repulsion magnets 35*b* at the positions corresponding to the locking magnets 27. The multiple attraction magnets 35*a* and the multiple repulsion magnets 35*b* can lock the operable portion 20 to the first attachment 41 more securely.

8. Effects

As described above, the pushbutton switch 15 with the above structure includes, as fully separate portions, the operable portion 20 and the detector 30 that are located on different surfaces, specifically the front and back surfaces, of the transparent support plate 13. The transparent support plate 13 thus eliminates an opening for receiving the pushbutton switch and avoids fracture due to a decrease in strength.

The above structure eliminates work for producing an opening in the transparent support plate 13 and facilitates attachment of the pushbutton switch 15. The above structure also reduces restrictions on the attachment position of the pushbutton switch 15, increasing flexibility in attachment.

A known pushbutton switch, which includes an operable portion 20 and a detector 30 integral with each other, is to have a different thickness for a transparent support plate 13 with a different thickness (or with a different depth of the attachment opening). In contrast, the pushbutton switch with the above structure is attachable to the transparent support plate 13 with a different thickness that allows the detector 30 to detect the pressed state of the button 21.

In the above structure, the electronic components for detecting the pressed state of the button 21 can be included without being located in the operable portion 20. More specifically, the multiple LEDs 38 for lighting the pushbutton switch 15 are located in the detector 30. The operable portion 20 uses no electricity and eliminates, for example, wiring, thus facilitating maintenance.

In the above structure, the button 21 includes a transparent portion. The detector 30 has an opening or is formed from a transparent material in its area corresponding to the button 21. This allows the screen of the display 12 to be viewed through the button 21.

The first attachment 41 and the second attachment 43 facilitate attachment of the operable portion 20 and the detector 30 to the transparent support plate 13.

Overview

A switch, a unit, and a machine according to one or more aspects of the present invention have the structures described below.

More specifically, a pushbutton switch according to an aspect of the present invention includes an operable portion attached to one surface of a support being a plate and at least partially including a transparent area, and a detector attached to another surface of the support and facing the operable portion with the transparent area being located between the detector and the operable portion. The operable portion includes a press portion, and the detector includes a sensor that detects a pressed state of the press portion through the transparent area.

The above structure includes the sensor for detecting the pressed state of the press portion through the transparent area of the support. Using this sensor, the detector and the operable portion are fully separate from each other and located on different surfaces, specifically the front and back surfaces, of the support. The support thus eliminates an opening for receiving the pushbutton switch and avoids fracture extending from an opening due to a decrease in strength.

The above structure eliminates work for producing an opening in the support and facilitates attachment of the pushbutton switch. The pushbutton switch can be attached at any position in the transparent area of the support. This reduces restrictions on the attachment position and increases flexibility in attachment.

A known pushbutton switch, which includes a detector and an operable portion integral with each other, is to have a different thickness for a support with a different thickness (or with a different depth of the attachment opening). In contrast, the pushbutton switch with the above structure is attachable to the support with a different thickness that allows the detector to detect the pressed state of the press portion.

In the above structure, the electronic component for detecting the pressed state of the press portion can be included without being located in the operable portion.

In the pushbutton switch according to the above aspect, the press portion may include a transparent portion, and the detector may have an opening in an area facing the transparent portion. In another aspect, the press portion may include a transparent portion, and the detector may contain a transparent material in an area facing the transparent portion. In the above structure, the operable portion includes the transparent portion. The detector has an opening or is formed from a transparent material in its area corresponding to the transparent portion. The player can thus view an area farther than the detector through the transparent portion of the operable portion.

The pushbutton switch according to the above aspect may further include an electronic component located in the detector without being located in the operable portion. In the above structure, the operable portion uses no electricity and eliminates, for example, wiring, thus facilitating maintenance.

The pushbutton switch according to one or more embodiments may further include a first attachment fixed to the first surface of the support and removably receiving the operable portion, and a second attachment fixed to the second surface of the support and removably receiving the detector. The above structure facilitates attachment of the operable portion and the detector to the support.

An operating unit according to one or more embodiments includes a transparent support and a display together serving as a touchscreen, and a pushbutton switch. The pushbutton switch includes an operable portion attached to a surface of the transparent support opposite to the display, and a detector attached to a surface of the transparent support adjacent to the display. The detector faces the operable portion. The operable portion includes a press portion. The detector includes a sensor that detects a pressed state of the press portion through the transparent support. The operating unit with the above structure allows its transparent support that supports the pushbutton switch to be resistant to fracture. The operating unit may be included in an amusement machine for receiving operations.

An amusement machine according to one or more embodiments includes a first display that displays an image for amusement, a transparent support and a second display together serving as a touchscreen, and a pushbutton switch. The pushbutton switch includes an operable portion attached to a surface of the transparent support opposite to the second display, and a detector attached to a surface of the transparent support adjacent to the second display. The detector faces the operable portion. The operable portion includes a press portion. The detector includes a sensor that detects a pressed state of the press portion through the transparent support. The amusement machine with the above structure allows its touchscreen that supports the pushbutton switch to be resistant to fracture.

The present invention is not limited to the above embodiments, but may be modified variously within the spirit and scope of the claimed invention. The technical means described in different embodiments may be combined as appropriate in other embodiments within the technical scope of the invention. The technical means described in different embodiments may be combined to produce a new technical feature.

The invention claimed is:

1. A pushbutton switch, comprising:

an operable portion attached to a first surface of a support comprising a plate and at least partially comprising a transparent area, the support extending entirely across an inner face of the operable portion opposite the press portion;

a detector attached to a second surface of the support opposite the first surface and facing the operable portion with the transparent area being located between the detector and the operable portion; and a touchscreen display facing the detector and the second surface of the support, wherein the operable portion comprises a press portion on an outer face of the operable portion, the detector is positioned between the second surface of the support and the touchscreen display, and the detector comprises a sensor configured to detect a pressed state of the press portion through the transparent area.

2. The pushbutton switch according to claim 1, wherein the press portion comprises a transparent portion, and the detector comprises an opening in an area facing the transparent portion.

3. The pushbutton switch according to claim 2, further comprising:

an electronic component located in the detector without being located in the operable portion.

4. The pushbutton switch according to claim 3, further comprising:

a first attachment fixed to the first surface of the support and removably receiving the operable portion; and a second attachment fixed to the second surface of the support and removably receiving the detector.

5. The pushbutton switch according to claim 2, further comprising:

a first attachment fixed to the first surface of the support and removably receiving the operable portion; and a second attachment fixed to the second surface of the support and removably receiving the detector.

6. The pushbutton switch according to claim 1, wherein the press portion comprises a transparent portion, and the detector comprises a transparent material in an area facing the transparent portion.

7. The pushbutton switch according to claim 6, further comprising:

an electronic component located in the detector without being located in the operable portion.

8. The pushbutton switch according to claim 7, further comprising:

a first attachment fixed to the first surface of the support and removably receiving the operable portion; and a second attachment fixed to the second surface of the support and removably receiving the detector.

9. The pushbutton switch according to claim 6, further comprising:

a first attachment fixed to the first surface of the support and removably receiving the operable portion; and a second attachment fixed to the second surface of the support and removably receiving the detector.

10. The pushbutton switch according to claim 1, further comprising:

an electronic component located in the detector without being located in the operable portion.

11. The pushbutton switch according to claim 10, further comprising:

a first attachment fixed to the first surface of the support and removably receiving the operable portion; and a second attachment fixed to the second surface of the support and removably receiving the detector.

12. The pushbutton switch according to claim 1, further comprising:

a first attachment fixed to the first surface of the support and removably receiving the operable portion; and a second attachment fixed to the second surface of the support and removably receiving the detector.

13. An operating unit, comprising:

a transparent support and a display together serving as a touchscreen; and a pushbutton switch, wherein the pushbutton switch comprises an operable portion attached to a first surface of the transparent support opposite to the display, and a detector attached to a second surface of the transparent support adjacent to the display, the detector facing the operable portion, the operable portion comprises a press portion on an outer face of the operable portion the transparent support extends entirely across an inner face of the operable portion opposite the press portion, the touchscreen facing the detector and the second surface of the transparent support, the detector is positioned between the second surface of the support and the touchscreen display, and the detector comprises a sensor configured to detect a pressed state of the press portion through the transparent support.

14. An amusement machine, comprising:

a first display configured to display an image for amusement;

a transparent support and a second display together serving as a touchscreen; and a pushbutton switch, wherein the pushbutton switch comprises an operable portion attached to a first surface of the transparent support opposite to the second display, and a detector attached to a second surface of the transparent support adjacent to the second display, the detector facing the operable portion, the operable portion comprises a press portion on an outer face of the operable portion, the transparent support extends entirely across an inner face of the operable portion opposite the press portion, the touchscreen facing the detector and the second surface of the transparent support, the detector is positioned between the second surface of the support and the touchscreen display, and the detector comprises a sensor configured to detect a pressed state of the press portion through the transparent support.

* * * * *